US012573849B2

(12) United States Patent
Yin et al.

(10) Patent No.: US 12,573,849 B2
(45) Date of Patent: Mar. 10, 2026

(54) METHODS AND CONTROL SYSTEMS FOR VOLTAGE CONTROL OF RENEWABLE ENERGY GENERATORS

(71) Applicant: VESTAS WIND SYSTEMS A/S, Aarhus N. (DK)

(72) Inventors: Bo Yin, Ikast (DK); Kouroush Nayebi, Ikast (DK); Torsten Lund, Fredericia (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 494 days.

(21) Appl. No.: 18/013,837

(22) PCT Filed: Jun. 3, 2021

(86) PCT No.: PCT/DK2021/050176
§ 371 (c)(1),
(2) Date: Dec. 29, 2022

(87) PCT Pub. No.: WO2022/002322
PCT Pub. Date: Jan. 6, 2022

(65) Prior Publication Data
US 2023/0291204 A1 Sep. 14, 2023

(30) Foreign Application Priority Data
Jun. 29, 2020 (DK) ............................ PA 2020 70430

(51) Int. Cl.
*H02J 3/18* (2006.01)
*H02J 3/38* (2006.01)

(52) U.S. Cl.
CPC ................ *H02J 3/18* (2013.01); *H02J 3/381* (2013.01); *H02J 2203/10* (2020.01); *H02J 2300/28* (2020.01)

(58) Field of Classification Search
CPC .......... H02J 3/18; H02J 3/381; H02J 2203/10; H02J 2300/28; H02J 3/50; Y02E 40/30
See application file for complete search history.

(56) References Cited

U.S. PATENT DOCUMENTS

2005/0046196 A1    3/2005  Larsen
2012/0010756 A1    1/2012  Larsen et al.
(Continued)

FOREIGN PATENT DOCUMENTS

EP        2221957 A1      8/2010
EP        2846434 A1      3/2015
(Continued)

OTHER PUBLICATIONS

International Search Report and Written Opinion for PCT Application No. PCT/DK2021/050176, dated Sep. 10, 2021.
(Continued)

*Primary Examiner* — Charles Cai
(74) *Attorney, Agent, or Firm* — Patterson + Sheridan, LLP; Gero G. McClellan

(57) ABSTRACT

Aspects of the present invention relate to a method for controlling a plurality of renewable energy generators. The method comprises: determining preliminary reactive power set points for the generators based on a reactive power reference value; determining generator-based and voltage-based reactive power limits for the generators; generating dispatch signals for requesting reactive power from the generators based on the preliminary set point and the limits; and dispatching the dispatch signals to the generators. The generator-based reactive power limits correspond to the reactive power capability of the generator. The voltage-based limits are determined by: determining a terminal voltage of the generator; comparing the determined terminal
(Continued)

voltage to a voltage limit; and determining the voltage-based reactive power limit based on the comparison.

20 Claims, 4 Drawing Sheets

(56)                    References Cited

U.S. PATENT DOCUMENTS

| | | | | | |
|---|---|---|---|---|---|
| 2013/0140817 | A1* | 6/2013 | Yin | .......................... | F03D 7/048 |
| | | | | | 290/44 |
| 2014/0062086 | A1 | 3/2014 | Mata Dumenjo et al. | | |
| 2015/0061289 | A1 | 3/2015 | Larsen et al. | | |
| 2015/0061290 | A1* | 3/2015 | Larsen | ...................... | F03D 7/04 |
| | | | | | 290/44 |
| 2021/0399550 | A1* | 12/2021 | Howard | .................... | H02J 3/50 |

FOREIGN PATENT DOCUMENTS

| | | | | | |
|---|---|---|---|---|---|
| EP | 3189573 | A1 | 7/2017 | | |
| WO | WO-2019034215 | A1 * | 2/2019 | ................ | H02J 3/18 |

OTHER PUBLICATIONS

Danish Patent Office, Search Opinion for Danish Patent Application No. PA 2020 70430, dated Jan. 18, 2021.
Danish Patent Office, Search Report for Danish Patent Application No. PA 2020 70430, dated Jan. 18, 2021.

* cited by examiner

Compare preliminary set point with reactive power limit for WTG — 202

For WTGs whose preliminary set point > limit, determine WTG deficiency as difference — 204

Sum WTG deficiencies to give WPP deficiency — 206

For generators where preliminary set point < limits, set point = preliminary set point + distributed portion of WPP deficiency — 208

200

METHODS AND CONTROL SYSTEMS FOR VOLTAGE CONTROL OF RENEWABLE ENERGY GENERATORS

TECHNICAL FIELD

The present disclosure relates to a method and control systems for voltage control in renewable energy power plants.

BACKGROUND

Renewable power plants, such as wind power plants, are required to provide support for voltage levels of the power network to which they are connected. That is, power plants are controlled to meet requirements set out by power plant controllers and power network operators that specify how reactive power exchange should be controlled to regulate voltage. The main aim during this 'voltage control' is to maintain the voltage level of the power network within a voltage dead-band, which is between approximately 0.9 p.u. and 1.1 p.u. voltage. Particular focus is placed on guiding the voltage levels towards a nominal or natural voltage level, typically 1 p.u. Maintaining voltage levels within the dead-band and around the nominal voltage prevents deviations that result in the application of extraordinary measures such as under- or over-voltage ride-through protocols.

In order to support voltage recovery during drops, i.e. deviations below 1 p.u. within the dead-band, renewable energy generators of the renewable power plants are controlled to supply reactive power. Where voltage levels rise above the nominal level, reactive power is absorbed to reduce voltage levels. The supply and absorption of reactive power may be considered in terms of the way in which supply and absorption is achieved, and may accordingly be considered in terms of capacitive- and inductive-reactive power respectively.

When controlling generators to provide capacitive- or inductive-reactive power support, the local voltage level and the voltage level of the network are both altered. In some networks that have a so-called 'weak grid interconnection', small changes in reactive power exchange cause large variations in local voltage. Thus, capacitive-reactive power support may cause local voltage levels to rise out of the dead-band, which may lead to emergency measures to be implemented, Similarly, inductive-reactive power support may cause local voltage levels to drop out of the dead-band, with the result being an under-voltage ride-through being initiated.

It is an aim of the present invention to address one or more of the disadvantages associated with the prior art.

SUMMARY OF THE INVENTION

According to an aspect of the present invention there is provided a method for controlling a plurality of renewable energy generators of a renewable energy power plant. The method comprises: determining preliminary reactive power set points for the generators based on a reactive power reference value for the power plant; determining generator-based reactive power limits and voltage-based reactive power limits for the generators; generating dispatch signals for requesting reactive power from the generators, the dispatch signals being generated based on the preliminary reactive power set point and the determined reactive power limits; and dispatching the dispatch signals to the generators. The generator-based reactive power limit for each generator corresponds to the reactive power capabilities of the generator. Determining the voltage-based reactive power limits comprises, for each generator: determining a terminal voltage of the renewable energy generator; comparing the determined terminal voltage to a voltage limit; and determining the voltage-based reactive power limit based on the comparison.

The generator-based reactive power limit may be derived from a current limit of a converter of the generator. The method may be performed by a power plant controller. The power plant controller may be configured to communicate with individual controllers of the plurality of renewable energy generators. The terminal voltage level may be a voltage level measured at a terminal of a line-side converter of the generator.

As can be seen from the above method, two different reactive power limits are determined. The first, a generator-based limit, indicates available reactive power and indicate the physical capabilities of the generator, which are typically the current capabilities of a converter of the generator. The second limit is a voltage-based limit, derived from a comparison of a local voltage level with a voltage limit. The voltage-based limit is derived from this comparison to specifically understand the local voltage conditions. Voltage levels may vary across a power plant depending upon the different levels of generation of active power and/or reactive power by the generators, different network impedances, and other electrical properties of the lines that connect the generators together to form the plant. Thus, it is useful to gain an understanding of the voltage levels and to implement a voltage-based reactive power limit that is specific to individual generators.

In implementing such a method, therefore, the generators are controlled according to two specified limits, and thus are protected from exceeding their own capabilities and from causing exceedances of voltage limits through their reactive power generation. As changes in reactive power have an influence on voltage levels, particularly local voltage levels in weaker grid interconnections, it is important to monitor voltage levels and to react when the voltages approach their limits. The control of reactive power according to those voltage levels prevents exceedances that may otherwise cause extraordinary measures to be taken which would disrupt the operation of the plant as a whole.

Determining the voltage-based reactive power limit may comprise, if the terminal voltage for a generator is equal to or exceeds the voltage limit, determining the voltage-based reactive power limit for that generator to reduce or prevent further exceedance of the voltage limit by the terminal voltage.

Determining the reactive power limit may comprise determining a voltage sub-range of an allowable voltage range, the voltage sub-range being bounded by the voltage limit. If the terminal voltage for a generator is within the voltage sub-range, determining the reactive power limit may comprise determining the voltage-based reactive power limit for that generator to prevent further change of the terminal voltage towards the voltage limit.

Utilising a sub-range bounded by the voltage limit enables a threshold to be set above which action is taken. Where the voltage is approaching the voltage limit but has not yet reached it, the method reacts to counteract the change in voltage towards the limit, thus reducing the likelihood of a deviation above the limits.

Determining the voltage-based reactive power limit may comprise determining a reactive power output value for the generator and setting the voltage-based reactive power limit equal to the reactive power output value.

Alternatively, determining the voltage-based reactive power limit may comprise determining a most-recent reactive power set point value for the generator and setting the voltage-based reactive power limit equal to the most-recent reactive power set point value.

In either case, the voltage-based reactive power limit is set as a prior value of the reactive power, as this represents a value at which the generator was operated within its voltage limits.

The method may further comprise: comparing the reactive power limits with the respective preliminary reactive power set points; if a preliminary reactive power set point for a generator exceeds one or more of the reactive power limits for that generator, determining a deficiency in reactive power for the generator based on the difference between the exceeded limited and the preliminary set point; determining a total deficiency in the reactive power for the plant as the sum of the determined deficiencies for each generator; and determining, according to a distribution of the total deficiency, an additional amount of reactive power to be provided by each generator for which the preliminary reactive power set point did not exceed the reactive power limits for that generator.

The distribution may be based on a difference between the terminal voltage of the generator and the voltage limit, The distribution may comprise requesting a higher proportion of the total deficiency from generators with a greater difference between the terminal voltage level and the voltage limit than from generators with a smaller difference between the terminal voltage level and the voltage limit.

Additionally, or alternatively, the method may comprise monitoring reactive power output levels of the generators, and wherein the distribution is based on the difference between the reactive power output levels and one or more of the reactive power limit levels. Additionally, or alternatively, the method may comprise: monitoring reactive power output levels of the generators; and determining production signs of the reactive power output levels, wherein the distribution is based on the determined production sign. Additionally, or alternatively, the method may comprise monitoring an active power value of each of the plurality of renewable energy generators, wherein the distribution is based on the active power value.

Determining the preliminary reactive power set point may comprise dividing a reactive power reference between the number of generators in the power plant.

The generator-based reactive power limit value for each generator may be determined by reference to a P-Q data structure that specifies reactive power limit levels based on active power measurements.

According to another aspect of the invention, there is provided a power plant controller for a power plant having a plurality of renewable energy generators. The controller comprises a processor and a memory module. The memory includes a set of program code instructions which, when executed by the processor, implement a method as described above.

The renewable energy generator may comprise a wind turbine generator in the controller or the method.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Generally, the invention described herein provides a method and a controller for implementing voltage control for a renewable energy generator. The method and controller ensure that operation of the generator, and particularly a converter of the generator, to provide reactive power support according to a received set point does not cause problematic voltage deviations and to mitigate existing deviations. This is achieved by implementing, at a power plant controller, reactive power limits that takes both physical capability and voltage level of the generators into account so that local voltage is retained within allowable levels.

Figure illustrates a typical architecture in which a wind power plant (WPP), which may also be referred to as a wind park or wind farm, is connected to a main grid as part of a wider power network. As will be understood by the skilled reader, a WPP comprises at least one wind turbine generator (WTG), and is also known as a wind park or a wind farm. A WTG is commonly referred to as a wind turbine. The examples shown are representative only and the skilled reader will appreciate that other specific architectures are possible, in relation to wind power plants, power plants for other renewable energy sources such as solar power plants, bio energy power plants, or ocean/wave/tidal energy plants, and to hybrid power plants having a combination of different types of renewable energy power plants. Thus, the invention also relates to renewable energy power plants and renewable energy generators in general, rather than being specific to wind power plants and generators as in the Figures. The components of the wind power plant and power network are conventional and as such would be familiar to the skilled reader. It is expected that other known components may be incorporated in addition to or as alternatives to the components shown and described in FIG. 1, Such changes would be within the capabilities of the skilled person.

Figure 1:
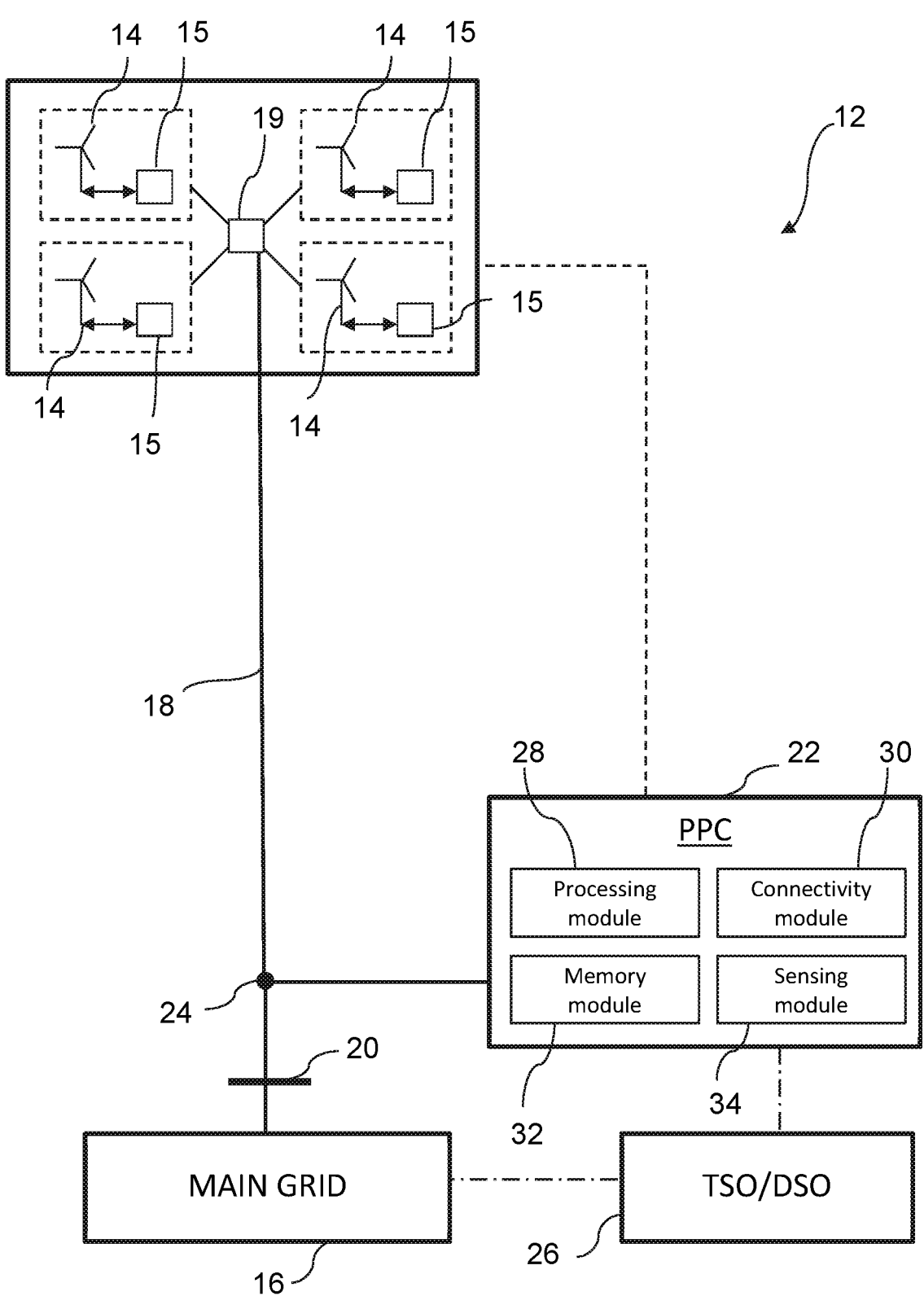
FIG. 1 shows a schematic representation of a power network.

FIG. 1 shows a power network incorporating a WPP 12 and a power plant controller 22, referred to hereafter as PPC 22. The WPP 12 includes a plurality of WTGs 14, Each of the plurality of WTGs 14 converts wind energy into electrical energy, which is transferred from the WPP 12 to a main transmission network or main grid 16, as active power and/or current, for distribution. Individual generators may each be referred to in this description as a 'unit'.

Although not illustrated in this Figure, the WPP 12 may also include compensation equipment, such as a static synchronous compensator (STATCOM) or another type of synchronous compensator, configured to provide reactive power or reactive current support as required. The WPP 12 may also include a battery energy storage system.

Each of the WTGs 14 is associated with a respective WTG controller 15. In some examples, a set of WTGs may share a single, semi-centralised WTG controller, such that there are fewer WTG controllers than WTGs. As would be understood by the skilled person, WTG controllers 15 can be considered to be computer systems capable of operating a WTG 14 in the manner prescribed herein, and may comprise multiple modules that control individual components of the WTG or just a single controller. The computer system of the WTG controller 15 may operate according to software downloaded via a communications network or programmed onto it from a computer-readable storage medium.

During normal operation of the WPP 12, the WTG controllers 15 operate to implement active and reactive current and/or power requests received from the PPC 22 to provide frequency and voltage support to the main grid 16. During extraordinary conditions, the WTG controllers 15 operate to fulfil predetermined network requirements, and also act to protect the WTGs 14 from any potentially harmful conditions.

The WPP 12 is connected to the main grid 16 (also called the main power network) by a connecting network 18. The WPP 12 and the main grid 16 are connected at a Point of Interconnection (PoI) 20, which is an interface between the WPP 12 and the main grid 16. The PoI 20 may also be referred to as the Point of Common Connection, which may be abbreviated to 'PCC' or 'PoCC'.

The WTGs 14 are connected to one another locally by local grid 19, (also called the local power network or park grid). The function of the local grid is to channel power from each of the WTGs 14 to the connecting network 18 to the main grid 16.

The Power Plant Controller (PPC) 22 is connected to the main grid 16 at a Point of Measurement (PoM) 24 and is connected to the WTG controllers 15. The role of the PPC 22 is to act as a command and control interface between the WPP 12 and the grid 16, and more specifically, between the WPP 12 and a grid operator, such as a transmission system operator (TSO) or a distribution system operator (DSO) 26. The PPC 22 is a suitable computer system for carrying out the controls and commands as described above and so incorporates a processing module 28, a connectivity module 30, a memory module 32 and a sensing module 34. The PPC 22 may also receive information regarding the grid 16 and/or the local buses, substations and networks from an energy management system (not shown). The WPP 12 is capable of altering its power or current output in reaction to commands received from the PPC 22.

As part of its operation, the PPC 22 generates and sends dispatch signals to the WTG controllers 15. The WTG controllers 15 control the WTGs according to set points contained within the dispatch signals.

During normal operation, the PPC 22 operates in one of a number of modes. One such mode is a voltage regulation, which may also be referred to as voltage control mode, in which the PPC 22 issues dispatch signals configured to cause the WTGs 14 to supply or absorb reactive power to regulate the voltage level of the power network. In particular, the PPC 22 supplies signals to the WTGs 14 for maintaining voltage levels within a voltage range, specifically a dead-band or 'acceptable voltage range', of between, approximately 0.9 per unit (p.u.) voltage and 1.1 p.u. voltage, as measured at the PoI 20 or PoM 24. In a specific example, the dead-band is between a lower voltage bound or limit of 0.87 p.u, and an upper voltage bound or limit of 1.13 p.u.

As would be understood by the skilled person, per-unit voltage is an expression of the voltage with respect to a base value which is used as a reference. Using a per-unit system allows for normalization of values across transformers and other components that may change the value by an order of magnitude.

The PPC 22 may issue a variety of different dispatch signals and set points to the WTG controllers 15 for implementation according to the mode in which the PPC 22 is operating. In the present embodiments, the PPC 22 is configured to issue dispatch signals to the WTG controllers 15 that indicate reactive power set points for the WTGs 14 to meet.

To regulate voltage, the IG controllers 15 generate control signals indicating reactive current set points for controlling a line-side converter of the WTG 14. The reactive current set points are based on the reactive power set points dispatched by the PPC 22 to the WTG controller 15.

There are a number of limits to the amount of reactive power a WTG 14 can supply. Conventionally, limits have been generated for reactive power support based on physical limits of the WTGs 14. As will be familiar to the skilled person, available reactive power is related to the maximum current a converter of the WTG can handle. Thus, these physical limits for each WTG 14 are related to the current limits of the converter of the WTG. However, as reactive power directly impacts voltage, as would be expected during a voltage control mode, it is important also to ensure that the voltage limits, i.e. the bounds of the voltage dead-band, are not exceeded, and/or that voltage excursions are mitigated where they do occur. Particularly, it is important to control changes in reactive power support made at either the PPC 22 or at the WTG controller 15 to ensure that the voltage limits are implemented to provide such mitigation or prevention. Thus, described below are measures identified by the inventors for voltage control that ensure that the reactive power support abides by both the reactive power limits set by physical capability of the WTGs and the voltage limits of the grid.

Figure 2:
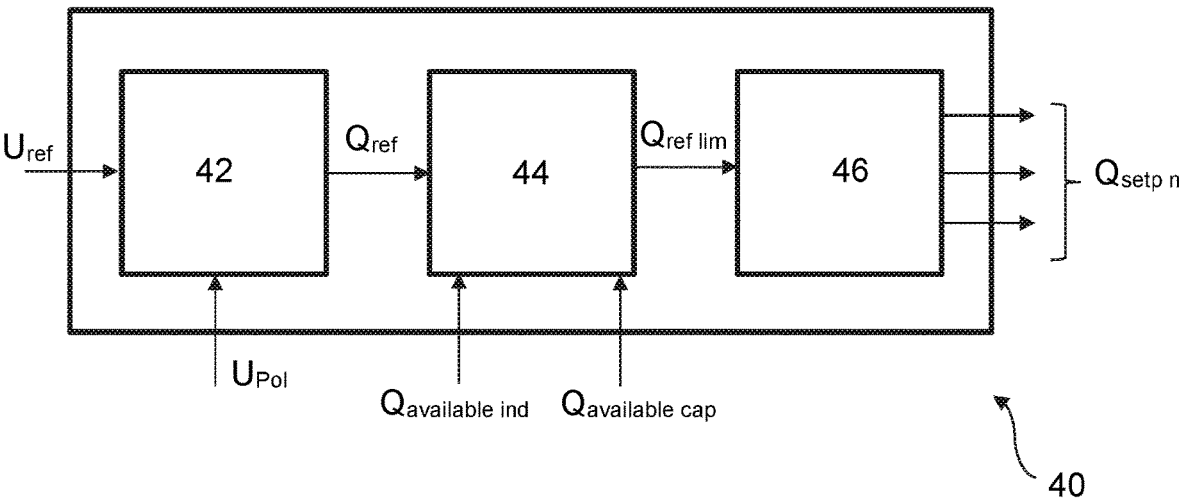
FIG. 2 shows a block diagram of a voltage controller for a power plant controller.
Figures 4, 5:
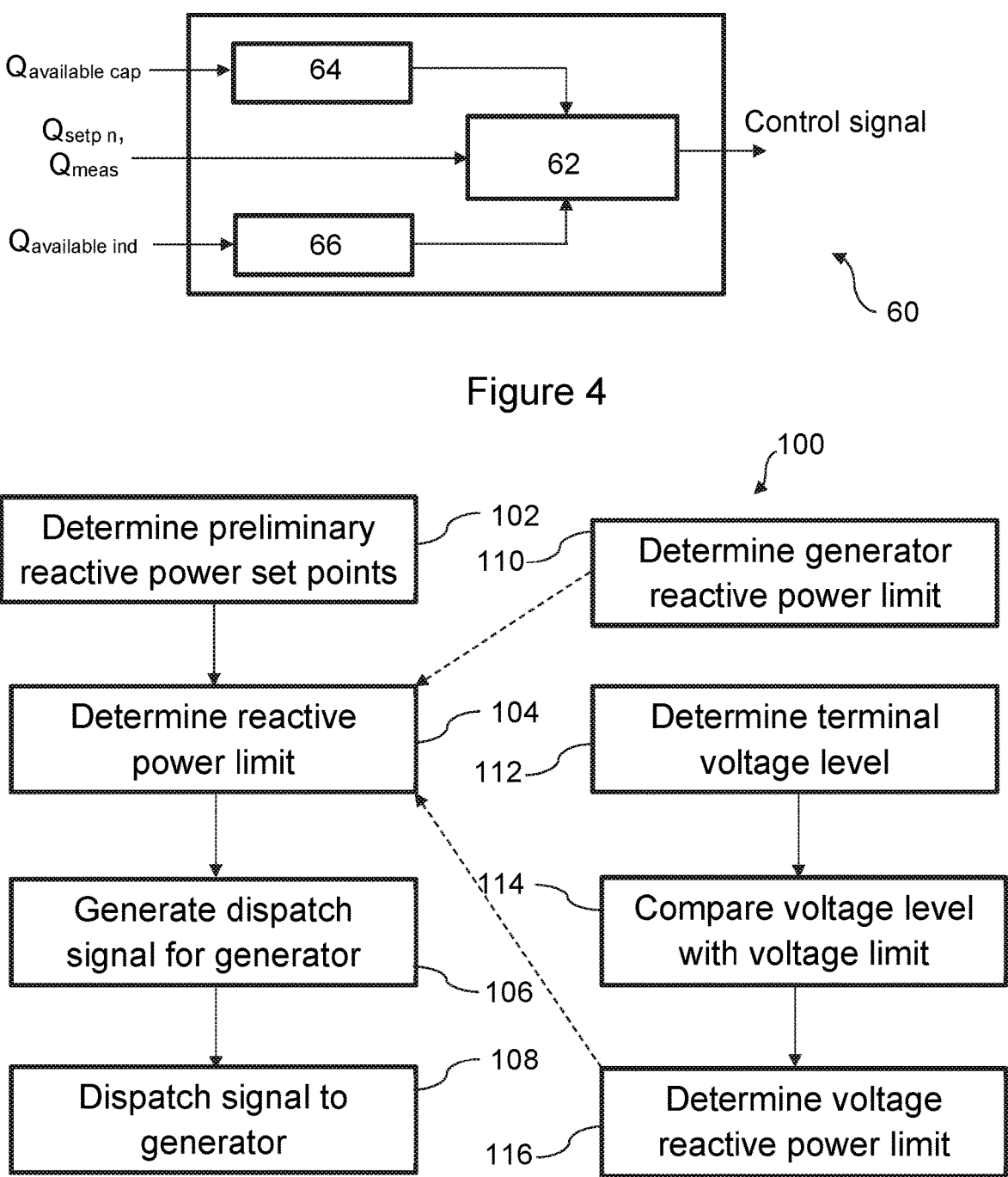
FIG. 4 shows a block diagram of a voltage control unit for a wind turbine generator according to an embodiment of the invention.
FIG. 5 shows a general method of operation for the dispatcher of the voltage controller of FIG. 2 according to an embodiment of the invention.

For context, the generation of reactive power set points by the PPC 22 and the implementation of those set points by the WTG controllers 15 are initially described in relation to FIGS. 2 and 4.

FIG. 2 shows a schematic representation of a PPC voltage control unit 40, contained within the processing module 28 of the PPC 22. The control unit 40 is configured to determine a reactive power reference value and to generate a plurality of reactive power set points that together achieve the reference value. It subsequently dispatches these set points to the WTG controllers 15.

As shown in FIG. 2, the PPC voltage control unit 40 comprises a reactive power controller 42. The reactive power controller 42 receives a voltage reference, 'U$_{ref}$', and a measured voltage at the PoI 20, 'U$_{Pol}$'. The reactive power controller 42 determines a deviation of the measured voltage from the voltage reference, and generates and outputs a reactive power reference value, 'Q$_{Ref}$'. The reactive power reference value Q_{ref} is the reactive power output to be met by the WPP 12 at the PoI 20.

Where measured values are discussed in these examples, this is envisaged to encompass direct measurements and determinations by other means. The values described as measured may be determined or measured indirectly based on a proxy value.

The reactive power reference value is passed through a reactive power reference limiter 44. The limiter 44 applies reactive power limits to the reference value and outputs a limited reference value, '$Q_{Ref\ lim}$'. In order to calculate the reference limits applied by the limiter 44, the PPC 22 receives reactive power capability values from each WIG 14. The capability values comprise a capacitive-reactive power capability, '$Q_{available\ Cap}$', and an inductive-reactive power capability, '$Q_{available\ ind}$'. These capability values correspond to the maximum available reactive power that each WTG 14 can supply and absorb respectively. The capability values are indicative of the physical limits of the WTG 14—i.e. they are the reactive power values that the WTG 14 is incapable of exceeding without causing damage to the systems. In particular, these physical capabilities are related to, or derived from, the current limits of the converter of the WTG. In some situations, the WTG 14 may be controlled to absorb or supply more reactive power but only for very short periods of time. In embodiments, the available reactive power or reactive power capability comprises the absolute maximum reactive power that the WTG can provide, i.e. without taking into account the current generation of the WTG. In other embodiments, the available reactive power or reactive power capability may be the reactive power available in addition to the current generation, i.e. the difference between the maximum and a measured value. In each case, the PPC and WTG controller adapt to take this reading into account and the set points distributed may differ accordingly. In general, in this application, embodiments are presented under the assumption that the reactive power capability is the absolute value.

The limits for the reactive power reference limiter 44 are generated by summing the capacitive-reactive power capabilities of all WTGs 14 in the WPP 12 and the inductive-reactive power capabilities of all WTGs 14 in the WPP 12, to provide upper and lower limits for the reference value. Thus, the limits may be expressed by the formula:

$$Q_{Ref\ Lim} = \left[ \sum_{k=1}^{N} Q_{Available\ ind} \quad \sum_{k=1}^{N} Q_{Available\ cap} \right]$$

Figure 3:
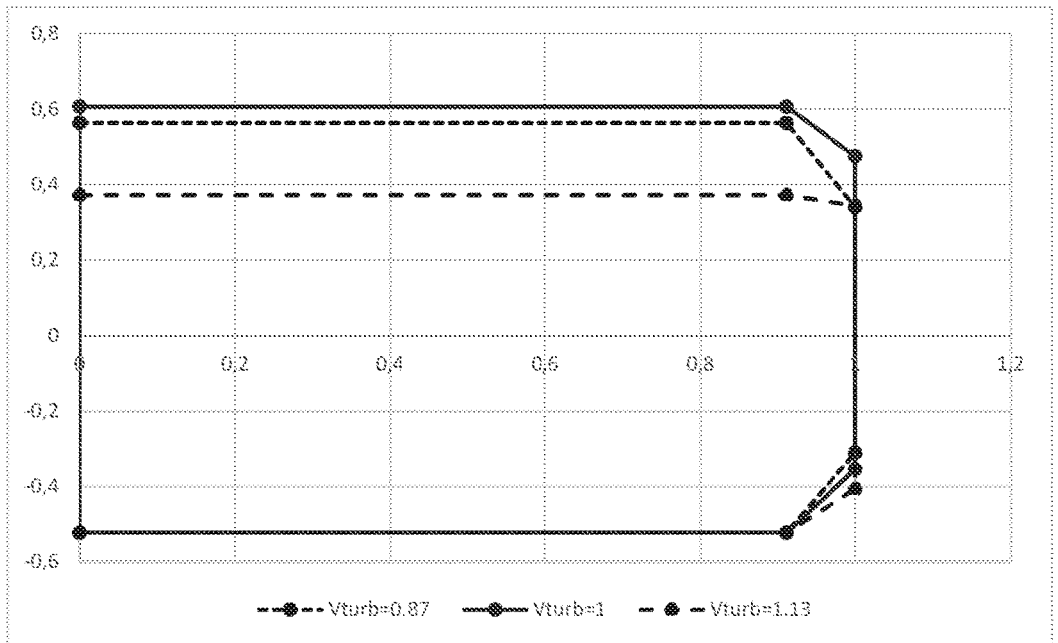
FIG. 3 shows a typical PQ chart for a wind turbine generator.

The capacitive-and inductive-reactive power capabilities received from the WTGs 14 are typically generated based on a P-Q chart. P-Q charts, an example of which is shown in FIG. 3, define the reactive power capability of the WTG 14 based on the active power output level of the WTG 14 and the voltage level. The P-Q chart of FIG. 3 plots active power in megawatts, on the x-axis, against reactive power in megavolt-amperes reactive on the y-axis. In this example, a solid line forming a trapezoidal shape represents the power generation capability of the WTG 14 when the power converter is operating at nominal voltage (1 p.u.). Also shown is a line formed of short dashes for a terminal voltage at its lower voltage limit, 0.87 p.u., and a line formed of longer dashes for terminal voltages at the upper limit 1:13 p.u. The skilled reader will appreciate that this shape is typical for any P-Q chart for a power generator of a WTG. The lines shown on the P-Q chart therefore define the long-term power generating capability of the WTG 14. As will be appreciated, a P-Q chart may be generated fora plurality of voltage levels within the voltage dead-band.

Moving back to FIG. 2, the limited reference value $Q_{ref\ lim}$ is passed to a reactive power dispatcher 46. The reactive power dispatcher 46 generates the individual reactive power set points, '$Q_{setp\ n}$' for dispatch to each WTG 14. The reactive power dispatcher 46 generates the reactive power set points by distributing the limited reference value between the WTGs 14 and further limiting them based on the capability values of the respective WTG and the terminal voltages of the WTGs. Where further limitations are applied, the dispatcher 46 may redistribute extra reactive power, as will be described below. Having generated the reactive power set points, the dispatcher 46 sends the set points to their respective WTG controllers 15.

FIG. 4 illustrates an example of WTG voltage control unit 60 for a WTG 14, which is housed within a WTG controller 15.

The WTG voltage control unit 60 comprises a reactive power controller 62. The reactive power controller 62 receives the set point, $Q_{setp\ n}$, as part of the dispatch signal from the PPC voltage control unit 40. In addition, the controller 62 receives a locally-measured reactive power level, $Q_{meas}$. By locally-measured it is meant that the level is measured at a terminal of the WTG 14. Inputs to blocks described in FIG. 4 may be filtered to remove anomalous data before being utilised in the blocks.

Based on the set point $Q_{setp\ n}$ received from the PPC voltage control unit 40 and the measured reactive power level $Q_{meas}$, the reactive power controller 62 generates a control signal for controlling the WTG 14 to meet the reactive power set point. Where the voltage control unit 60 is housed within a line-side converter, the control signal comprises a reactive current set point for controlling the line-side converter.

Importantly, in order to ensure that the WTG capability limits are not exceeded, the control signal is generated by the reactive power controller 62 with respect to input from an upper reactive power limit unit 64 and a lower reactive power limit unit 66. These units 64, 66 apply reactive power limits according to the capability values of the wind turbine, $Q_{available\ cap}$ and $Q_{available\ ind}$, and provide signals to the reactive power controller 62 to restrict the allowed range of reactive power that can be requested by the control signal.

Thus, the WTG 14 is controlled to provide reactive power support according to its physical capability as defined by the P-Q chart in both the PPC and WTG voltage control units.

As described above, the voltage control implemented between the PPC 22 and the WTG controllers 15 is implemented to ensure the WTG 14 abides by local voltage limits. In order to implement these limits, the PPC 22 monitors the voltage levels of terminals of the WTGs 14 and applies voltage-based reactive power limits to the reactive power set points it distributes based on the monitored voltage levels. In addition, the distribution of reactive power by the reactive power dispatcher 46 is adjusted to take account of the voltage limits so that the reactive power set points are distributed to help maintain the turbines within their voltage limits.

The PPC 22 utilises determined local voltage levels to ensure that the WTGs 14 are controlled according to their individual circumstances. That is, that local voltage levels are dependent upon the properties of the grid to which the WTG is connected. The voltage levels are variable depending upon a number of parameters, and so local voltage levels may differ at different generators, For example, the active power generation and reactive power generation of WTGs may differ, and both affect local voltage levels. In addition, different impedances may exist between the WTGs and the local connecting network, and other parameters that affect voltage may also vary between WTGs. Thus, the determination of a local voltage for the WTGs, and its use in comparison with voltage levels ensures that each WTG is adequately catered for and that they do not individually exceed the limits set for them.

Figure 6:
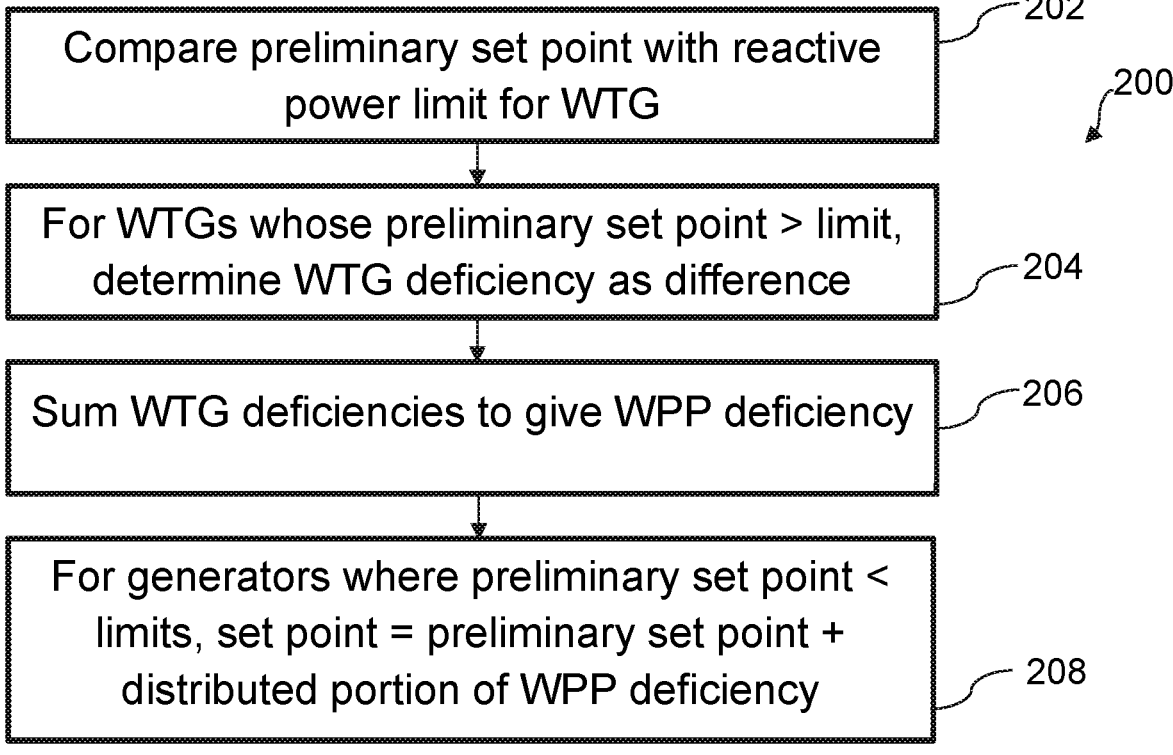
FIG. 6 shows a method of operation of the dispatcher for distributing a deficiency in reactive power.

The operation of the dispatcher 46 in response to receiving the limited reference value $Q_{ref\ lim}$ can be described according to the methods 100, 200 shown in FIGS. 5 and 6. FIG. 5 shows a method 100 for the general operation of the dispatcher 46 in which voltage limits are applied to a WTG set point if the monitored voltage of the WTG 14 approaches a voltage limit. FIG. 6 shows a method 200 of how a deficiency in reactive power, which may occur if limits are implemented, is distributed between some of the WTGs to ensure the WPP 12 complies with the requested reactive power reference value.

While these methods 100, 200 are discussed as being performed by the dispatcher 46, it will be appreciated that the methods 100, 200 may be performed elsewhere in the PPC 22 as required. For example, the dispatcher 46 may perform the duty of dispatching the set points to the WTGs 14, while other, intermediate modules may perform methods 100 and 200 to apply limits and distribute the deficiency.

Turning first to the method 100 of FIG. 5, at a first step 102, preliminary reactive power set points for the WTGs 14 in the WPP 12 are determined. The preliminary reactive power set points are based on the reactive power reference value for the WPP 12, which, in the above embodiment is the limited reactive power reference value $Q_{ref\ lim}$. As will be described below, the preliminary reactive power set points may be determined by dividing the reference equally between the WTGs 14, so that the preliminary reactive power set points for each of the WTGs are equal. This may be written as dividing the limited reference value $Q_{ref\ lim}$ by the number of WTGs 14, N, to give the preliminary reactive power set point $Q_{ref\ lim\ WTG}$ so that $Q_{ref\ lim\ WTG}=Q_{ref\ lim}/N$. The preliminary set points may be determined in other ways.

At a next step 104 of method 100, at least one reactive power limit for each WTG is determined. This step 104 comprises the steps 110, 112, 114, 116 illustrated to the right of the method 100. These steps include determining 110 a first, generator-based reactive power limit corresponding to the reactive power capability of the generator. The determination 104 of reactive power limits also includes: determining 112 a measured terminal voltage; comparing 114 the measured terminal voltage with a voltage limit and, in dependence or based on the comparison, determining 116 a second, voltage-based reactive power limit. Each of these steps is explored in more detail below.

Having determined the limits at step 104, a dispatch signal is generated at step 106. The dispatch signal is a signal for dispatching to the WTGs 14 to request reactive power from the WTGs 14 according to a set point. The dispatch signal is generated based on the determined preliminary set point from step 102 and the limits determined in step 104. The dispatch signal may comprise an overall, limited set point, wherein the preliminary set point has been compared with the determined limits, and if the preliminary set point exceeded a limit, the limited set point is the limit and otherwise the preliminary set point. Alternatively, the dispatch signal may comprise the preliminary set point and the limits separately, for application of the limits to the set point by the WTG controller 15. In a further alternative, the set point included in the dispatch signal may be the preliminary set point that has been limited by one of the limits, i.e. the reactive power capability limit, and the dispatch signal may also communicate the voltage-based reactive power limits to the WTG controller 15 for subsequent application.

At step 108, the dispatch signals for each of the WTGs 14 are dispatched to relevant WTG controller 15.

The method 100 therefore implements voltage-based reactive power limits based on a comparison of voltage levels with voltage limits to ensure local adherence to the voltage limits by the terminals.

To expand on the determination of limits, the first, generator-based reactive power limit, determined at step 110, comprises determining the reactive power capability values $Q_{available\ ind}$ and $Q_{available\ cap}$ that have already been received by the PPC 22.

Next, the voltage-based reactive power limits are determined, at steps 112, 114, and 116. The aim of the method 100 as a whole is to prevent the reactive power set points provided to the WTGs from causing exceedances of the voltage limits. Accordingly, in the method 100 limits are determined and placed on the set points to prevent problematic changes to the voltage level, i.e. to reduce or prevent further exceedance of the voltage limits by the terminal voltage.

According to a specific embodiment, the voltage-based reactive power limits are based on voltage sub-ranges. The voltage sub-ranges are sub-ranges within the voltage deadband, also referred to as the allowable voltage range, which is typically between approximately 0.9 p.u. and 1.1 p.u. The sub-ranges are each bounded by one of the outer limits of the wider range, and have a predefined width. So, for example, where the allowable range is 0.9 to 1.1 p.u. and the sub-ranges have a width of 0.03 p.u., the sub-ranges extend from 0.9 to 0.93 p.u. and 1.07 to 1.1 p.u.

In this embodiment, when the monitored voltage falls within the allowable range, but not within the sub-ranges (i.e. between 0.93 p.u. and 1.07 p.u.), the PPC 22 determines that no additional reactive power limit is required because the difference between the monitored voltage level and the voltage limits is sufficiently large. When the monitored voltage falls within one of the sub-ranges, the PPC 22 acts to prevent further voltage change towards the outer limits, .9 p.u. and 1.1 p.u., by implementing a reactive power limit. The limit is implemented based on an existing reactive power level, either the measured reactive power level or the most recent reactive power set point. The PPC 22 takes the existing reactive power level and effectively 'clamps' the reactive power output of the WTG 14 to that reactive power level—the limit, either being an upper limit or lower limit depending upon which sub-range the voltage falls within, is set as the existing reactive power level to prevent further change in reactive power output that would cause the voltage to move towards its limit.

The limits are applied based on a comparison between the limits and the preliminary set point to determine if the set point exceeds one or more of the limits. If the preliminary set point does exceed a limit, the set point is re-set as the limit it exceeds. Otherwise, the set point remains the preliminary set point. So, if a voltage-based reactive power limit is calculated because the monitored voltage level is close to the voltage limits, the limit only applies where the PPC 22 attempts to increase the set point above the measured reactive power or previous set point. Thus, the PPC 22 restricts changes of the individual reactive power set points sent to WTGs 14 to prevent exceedance of local voltage limits and of reactive power capability limits.

In instances where the voltage level exceeds the voltage limits, the PPC 22 implements reactive power limits as applied within the sub-range to prevent further deviation from the voltage limits. In other words, where the monitored voltage exceeds the voltage limits and is outside the dead-band and sub-ranges, a voltage-based reactive power limit is determined as equal to either the measured reactive power output or as the most recent set point for reactive power.

In other embodiments, voltage limits may be applied that are proportional to the difference between the monitored voltage level and the limits. In some of these embodiments, clamping or freezing of the limits to an existing reactive power level may be performed within the sub-range, but outside of it the limits may be proportional to the difference.

The limits on the set point may be changes once the terminal voltage returns to within the acceptable range, outside of the sub-ranges.

In order to protect the WTGS 14 from voltage oscillations, a ramp rate limit may also be introduced, so that changes in reactive power are smooth and sufficiently slow to prevent disturbances to the voltage level. If no ramp rate is employed, the change in reactive power may be too fat and may cause the voltage level to rise rapidly, causing an exceedance of the limits. The use of a ramp rate limiter lends itself particularly well to instances where the invention is to be employed in a weak grid environment.

While the application of limits in generating set points is useful in ensuring that voltage levels are not exceeded, the PPC 22 operates to fulfil a requested reference value. In limiting a set point, some reactive power is inherently 'lost' and unaccounted for. Therefore, while not essential, it is useful to be able to provide some form of compensation for the lost reactive power.

An example of a method of compensation is found in FIG. 6. In the method 200 of FIG. 6, reactive power deficiencies caused by implementing one or more limits on a set point for a WTG, are summed and redistributed between WTGs that are able to accommodate increased reactive power.

At a first step 202, for each WTG the dispatcher 46 compares the preliminary reactive power set point with the relevant determined reactive power limits for the WTG 14. This comparison determines if the preliminary set point exceeds the limits or if the preliminary set point is equal to or less than the limits.

At step 204, for WTGs whose preliminary set point exceeded one of the limits for the WTG, a WTG deficiency value is determined as the difference between the limit and the preliminary set point. This WTG deficiency value indicates an amount of reactive power that is lost when the preliminary set point is limited by the determined limits. For WTGs whose preliminary set point did not exceed the relevant limits, no deficiency is determined. This step is not depicted in method 200.

At step 206, the WTG deficiencies are summed to arrive at a total deficiency, referred to as a WPP deficiency, for the WPP 12 as a whole.

At step 208, the set points for the WTGs whose limits were not exceeded by the preliminary set point in the comparison of step 202. The non-exceedance of the limits by the preliminary set point indicates that the WTGs will have some spare capacity for receiving a higher demand for reactive power than the WTGs who have a deficiency. At step 208, the WPP deficiency is distributed between the WTGs for which the preliminary set point did not exceed the reactive power limits for that WTG, and the PPC 22 determines an additional amount, or a distributed portion, of reactive power to be provided by each of those WTGs. The additional amount is determined according to a distribution of the WPP deficiency. The set point for those WTGs is therefore the preliminary set point plus the additional amount. In other words, WTGs 14 whose limits were not exceeded make up the shortfall in reactive power so that the WPP 12 and PPC 22 fulfil the reactive power reference value they receive.

Subsequently, the dispatch set points that form part of the dispatch set points are therefore either limited based on the determined limits, are the preliminary set point only, or are new set points that comprise the preliminary set point and an additional, extra amount according to the distribution.

The distribution may be based on one or more specific parameters, or may be a distribution of the deficiency equally between the WTGs.

In some examples, for each WTG 14, the dispatcher 64 utilises the monitored local voltage level and determines a difference between the local voltage level and a voltage limit. The local voltage level is generally the terminal voltage level of the WTG, although it may be another local voltage level in some embodiments. The dispatcher accordingly distributes the deficiency between the WTGs having excess capability based on the determined difference in voltages.

This distribution according to voltage level may be performed in a number of ways. According to some embodiments, the distribution of the overall deficiency is performed using a threshold difference value. That is, that the deficiency is distributed to WTGs for which the difference between their local voltage level and the limit is less than a threshold. In an example, the sub-range of voltages may also be used to implement the distribution. In these embodiments, the deficiency is distributed between WTGs whose measured voltage level is outside of the sub-ranges, and thus is more than a predetermined value away from the limit values. Using the above example where the limit values are 0.9 and 1.1 p.u., this would mean that the distribution of the total deficiency is to WTGs whose monitored local voltage is between the values 0.93 and 1.07 p.u. In some embodiments, the sub-ranges for calculating the distribution may be wider than the sub-ranges for determining voltage-based reactive power limits.

In some embodiments, the distribution of the overall deficiency may be based on the magnitude of the difference between the measured voltage and the limit voltages. In particular, the distribution may be proportional to the difference, either directly or indirectly. In other words, the amount of additional reactive power requested from WTGs to account for the deficiency may be higher for WTGs whose voltage difference is higher than from those whose voltage difference is lower. WTGs whose voltage levels are closer to the nominal level (1 p.u.) would therefore be assigned a higher proportion of the deficiency than WTGs whose voltage levels are further from the nominal level.

This may be a directly proportional distribution, whereby the size of the difference directly indicates the amount of extra requested power. In other embodiments, the distribution may be indirectly proportional, whereby the voltage differences are classified in an intermediate way before the distribution takes place. Examples of indirect distribution may, for example, comprise defining a plurality of bins for categorising the WTGs according to their difference level, and wherein the bins are each assigned an amount of the deficiency. Alternatively, the WTGs may be ordered according to their voltage difference levels and assigned an amount of reactive power based on their position in the order.

In some embodiments, the distribution may also be based on different parameters, such as reactive power and/or active power values, as well as voltage difference levels. Parameters upon which the distribution may also be based include: the difference between a measured reactive power level and one or more of the capability limit values; the difference between the threshold value and one or more of the capability limit values; the reactive power production sign, i.e. whether the reactive power is capacitive or inductive reactive power; and the active power output level or set point level of the WTG. One or more of these parameters may be utilised in addition to the voltage difference to determine the distribution.

It will be appreciated that the distribution of the overall deficiency will be made with respect to the capability values of each WTG. The dispatcher 46 utilises the capability values to compare with the distribution, to ensure that the limits are abided by. In a particular example, a further deficiency value is calculated for the WTGs between which the first overall deficiency was distributed and the further deficiency is redistributed once again to WTGs with remaining capacity. This process of calculating deficiency values may be iteratively repeated until no deficiency remains.

While FIG. 6 demonstrates one way in which the reactive power may be compensated, the compensation may be performed in other ways. For example, in some embodiments, the PPC 22 may increase the set points by a correction factor to ensure that the set point is met, based on an expected loss from applying the limits.

Returning briefly to FIG. 5, in the above description the steps 106 and 108 of generating and dispatching the dispatch signal are assumed to contain a set point that the WTGs can follow. However, in some embodiments, the dispatch signal may include the preliminary set point and the limits, so that the PPC 22 determines these values but the WTG controllers 15 implement the limits on the preliminary set point within a voltage controller. In other embodiments, the preliminary set point may be partially limited and the other limit may be communicated along with the partially limited set point to the WTG controllers 15. In addition, the set point dispatched to the WTG may be a voltage set point as well as or as an alternative to a reactive power set point. These options are available where the WTG controllers 15 comprise a voltage drop or droop controller for implementing voltage set points, reactive power set points, and reactive power slope control.

It will be appreciated that various changes and modifications can be made to the present invention without departing from the scope of the present application.

The invention claimed is:

1. A method for controlling a plurality of renewable energy generators of a renewable energy power plant, the method comprising:

determining preliminary reactive power set points for the generators based on a reactive power reference value for the power plant;

determining generator-based reactive power limits and voltage-based reactive power limits for the generators;

generating dispatch signals for requesting reactive power from the generators, the dispatch signals being generated based on the preliminary reactive power set point and the determined reactive power limits; and dispatching the dispatch signals to the generators;

wherein the generator-based reactive power limit for each generator corresponds to the reactive power capabilities of the generator, and wherein determining the voltage-based reactive power limits comprises, for each generator:

determining a terminal voltage of the renewable energy generator;

comparing the determined terminal voltage to a voltage limit; and determining the voltage-based reactive power limit based on the comparison, and wherein determining the voltage-based reactive power limit comprises determining a voltage sub-range of an allowable voltage range, the voltage sub-range being bounded by the voltage limit, and, in response to the terminal voltage for a generator being within the voltage sub-range, determining the voltage-based reactive power limit for that generator to prevent further change of the terminal voltage towards the voltage limit.

2. The method of claim 1, wherein determining the voltage-based reactive power limit comprises, in response to the terminal voltage for a generator being equal to or exceeding the voltage limit, determining the voltage-based reactive power limit for that generator to reduce or prevent further exceedance of the voltage limit by the terminal voltage.

3. The method of claim 2, wherein determining the voltage-based reactive power limit comprises determining a reactive power output value for the generator and setting the voltage-based reactive power limit equal to the reactive power output value.

4. The method of claim 2, wherein determining the voltage-based reactive power limit comprises determining a most-recent reactive power set point value for the generator and setting the voltage-based reactive power limit equal to the most-recent reactive power set point value.

5. The method of claim 1, comprising:

comparing the reactive power limits with the respective preliminary reactive power set points;

in response to a preliminary reactive power set point for a generator exceeding one or more of the reactive power limits for that generator, determining a deficiency in reactive power for the generator based on the difference between the exceeded limit and the preliminary set point;

determining a total deficiency in the reactive power for the plant as the sum of the determined deficiencies for each generator; and determining, according to a distribution of the total deficiency, an additional amount of reactive power to be provided by each generator for which the preliminary reactive power set point did not exceed the reactive power limits for that generator.

6. The method of claim 5, wherein the distribution is based on a difference between the terminal voltage of the generator and the voltage limit.

7. The method of claim 5, wherein the distribution comprises requesting a higher proportion of the total deficiency from generators with a greater difference between the terminal voltage and the voltage limit than from generators with a smaller difference between the terminal voltage level and the voltage limit.

8. The method of claim 5, comprising monitoring reactive power output levels of the generators, and wherein the distribution is based on the difference between the reactive power output levels and one or more of the reactive power limit levels.

9. The method of claim 5, comprising:

monitoring reactive power output levels of the generators; and determining production signs of the reactive power output levels, wherein the distribution is based on the determined production signs.

10. The method of claim 5, comprising:

monitoring an active power value of each of the plurality of renewable energy generators, wherein the distribution is based on the active power value.

11. The method of claim 1, wherein determining the preliminary reactive power set point comprises dividing a reactive power reference between the number of generators in the power plant.

12. The method of claim 1, wherein the generator-based reactive power limit for each generator is determined by reference to a P-Q data structure that specifies reactive power limit levels based on active power measurements.

13. The method of claim 1, wherein the renewable energy generator comprises a wind turbine generator.

14. A power plant controller for a power plant having a plurality of renewable energy generators, wherein the controller comprises:

a memory module including a set of program code instructions; and one or more processors, which, when programmed with the set of program code instructions, cause the one or more processors to perform an operation for controlling a plurality of renewable energy generators of a renewable energy power plant, the operation comprising:

determining preliminary reactive power set points for the generators based on a reactive power reference value for the power plant;

determining generator-based reactive power limits and voltage-based reactive power limits for the generators;

generating dispatch signals for requesting reactive power from the generators, the dispatch signals being generated based on the preliminary reactive power set points and the determined reactive power limits; and dispatching the dispatch signals to the generators;

wherein the generator-based reactive power limit for each generator corresponds to the reactive power capabilities of the generator, and wherein determining the voltage-based reactive power limits comprises, for each generator:

determining a terminal voltage of the renewable energy generator;

comparing the determined terminal voltage to a voltage limit; and determining the voltage-based reactive power limit based on the comparison, and wherein determining the voltage-based reactive power limit comprises determining a most-recent reactive power set point value for the generator and setting the voltage-based reactive power limit equal to the most-recent reactive power set point value.

15. The power plant controller of claim 14, wherein the renewable energy generator comprises a wind turbine generator.

16. The power plant controller of claim 14, wherein determining the voltage-based reactive power limit comprises determining a voltage sub-range of an allowable voltage range, the voltage sub-range being bounded by the voltage limit, and, in response to the terminal voltage for a generator being within the voltage sub-range, determining the voltage-based reactive power limit for that generator to prevent further change of the terminal voltage towards the voltage limit.

17. The power plant controller of claim 14, wherein the operation further comprises:

comparing the reactive power limits with the respective preliminary reactive power set points;

in response to a preliminary reactive power set point for a generator exceeding one or more of the reactive power limits for that generator, determining a deficiency in reactive power for the generator based on the difference between the exceeded limit and the preliminary set point;

determining a total deficiency in the reactive power for the plant as the sum of the determined deficiencies for each generator;

determining, according to a distribution of the total deficiency, an additional amount of reactive power to be provided by each generator for which the preliminary reactive power set point did not exceed the reactive power limits for that generator;

monitoring reactive power output levels of the generators; and determining production signs of the reactive power output levels, wherein the distribution is based on the determined production signs.

18. A power plant, comprising:

a plurality of renewable energy generators;

a power plant controller configured to:

determine preliminary reactive power set points for the generators based on a reactive power reference value for the power plant;

determine generator-based reactive power limits and voltage-based reactive power limits for the generators, wherein the generator-based reactive power limit for each generator corresponds to the reactive power capabilities of the generator;

generate dispatch signals for requesting reactive power from the generators, the dispatch signals being generated based on the preliminary reactive power set points and the determined reactive power limits;

dispatch the dispatch signals to the generators;

compare the reactive power limits with the respective preliminary reactive power set points;

in response to a preliminary reactive power set point for a generator exceeding one or more of the reactive power limits for that generator, determine a deficiency in reactive power for the generator based on the difference between the exceeded limit and the preliminary set point;

determine a total deficiency in the reactive power for the plant as the sum of the determined deficiencies for each generator;

determine, according to a distribution of the total deficiency, an additional amount of reactive power to be provided by each generator for which the preliminary reactive power set point did not exceed the reactive power limits for that generator;

monitor reactive power output levels of the generators; and determine production signs of the reactive power output levels, wherein the distribution is based on the determined production signs.

19. The power plant of claim 18, wherein determining the voltage-based reactive power limit comprises determining a voltage sub-range of an allowable voltage range, the voltage sub-range being bounded by the voltage limit, and, in response to the terminal voltage for a generator being within the voltage sub-range, determining the voltage-based reactive power limit for that generator to prevent further change of the terminal voltage towards the voltage limit.

20. The power plant of claim 18, wherein determining the voltage-based reactive power limit comprises determining a most-recent reactive power set point value for the generator and setting the voltage-based reactive power limit equal to the most-recent reactive power set point value.

* * * * *